(12) United States Patent
Xiong (10) Patent No.: US 9,990,004 B2
(45) Date of Patent: Jun. 5, 2018

(54) OPTICAL DETECTION OF BENDING MOTIONS OF A FLEXIBLE DISPLAY

(71) Applicant: Samsung Display Co., Ltd., Yongin, Gyeonggi-Do (KR)

(72) Inventor: Wei Xiong, Mountain View, CA (US)

(73) Assignee: Samsung Dispaly Co., Ltd., Yongin-si (KR)

( * ) Notice: Subject to any disclaimer, the term of this patent is extended or adjusted under 35 U.S.C. 154(b) by 0 days. days.

(21) Appl. No.: 14/229,668

(22) Filed: Mar. 28, 2014

(65) Prior Publication Data

US 2014/0292650 A1    Oct. 2, 2014

Related U.S. Application Data

(60) Provisional application No. 61/807,669, filed on Apr. 2, 2013.

(51) Int. Cl.
| | |
|---|---|
| G06F 1/16 | (2006.01) |
| G06F 3/03 | (2006.01) |
| G06F 3/0487 | (2013.01) |
| G06F 3/01 | (2006.01) |
| H04N 5/232 | (2006.01) |

(Continued)

(52) U.S. Cl.
CPC .......... *G06F 1/1652* (2013.01); *G06F 3/017* (2013.01); *G06F 3/0304* (2013.01); *G06F 3/0487* (2013.01); *G06F 2203/04102* (2013.01); *G06T 7/11* (2017.01); *G06T 7/292* (2017.01);

(Continued)

(58) Field of Classification Search
CPC ......... G06F 2203/04102; G06F 3/0412; G06F 3/0304; G06F 3/017; G06F 3/0487; G06F 1/1652; H01L 51/0097; H01L 2251/5338; H04M 1/0268; G06T 7/0022; G06T 7/0061; G06T 7/0065; G06T 5/50; G06T 7/33; G06T 7/292; G06T 7/11
See application file for complete search history.

(56) References Cited

U.S. PATENT DOCUMENTS

| | | | | |
|---|---|---|---|---|
| 5,680,217 A | * | 10/1997 | Yli-Vakkuri | G01B 11/2545 356/602 |
| 5,899,964 A | * | 5/1999 | Ooenoki | B21D 5/02 382/141 |

(Continued)

FOREIGN PATENT DOCUMENTS

| | | |
|---|---|---|
| CN | 102652322 A | 8/2012 |
| CN | 102667662 A | 9/2012 |

(Continued)

OTHER PUBLICATIONS

Extended European Search Report dated Nov. 13, 2014 for European Patent Application No. EP 14163274.5, 15 pages.

(Continued)

*Primary Examiner* — Darlene M Ritchie
(74) *Attorney, Agent, or Firm* — Lewis Roca Rothgerber Christie LLP (57) ABSTRACT

A detection device of a flexible display, the detection device including image sensors configured to capture images, a processor configured to process the images captured by the image sensors, and a memory having instructions stored therein that, when executed by the processor, result in calculation of a bend angle of the flexible display by comparing the images captured at differing times over time.

16 Claims, 4 Drawing Sheets

(51) Int. Cl.
  *H04M 1/02*   (2006.01)
  *G06T 7/11*   (2017.01)
  *G06T 7/292*  (2017.01)
  *G06T 7/33*   (2017.01)

(52) U.S. Cl.
  CPC ............. *G06T 7/33* (2017.01); *H04M 1/0268* (2013.01); *H04N 5/23248* (2013.01)

(56) References Cited

U.S. PATENT DOCUMENTS

| | | | |
|---|---|---|---|
| 6,944,227 B1* | 9/2005 | Bober | G06T 9/008 375/240.22 |
| 2004/0175039 A1* | 9/2004 | Miller | G06K 9/00208 382/181 |
| 2007/0140528 A1* | 6/2007 | Anai | G06T 7/0028 382/106 |
| 2007/0247422 A1 | 10/2007 | Vertegaal et al. | |
| 2008/0083288 A1* | 4/2008 | Glaesemann | G01N 3/20 73/849 |
| 2009/0219401 A1* | 9/2009 | Drouot | H04N 5/23254 348/208.4 |
| 2010/0220184 A1* | 9/2010 | Appleyard | B21D 55/00 348/86 |
| 2010/0295953 A1* | 11/2010 | Torii | G06T 5/003 348/208.4 |
| 2011/0102314 A1* | 5/2011 | Roux | G06F 15/02 345/156 |
| 2012/0013713 A1* | 1/2012 | Sumitomo | B60R 1/00 348/46 |
| 2012/0026335 A1* | 2/2012 | Brown | G01S 5/16 348/159 |
| 2012/0075166 A1 | 3/2012 | Marti et al. | |
| 2012/0092363 A1 | 4/2012 | Kim et al. | |
| 2012/0162379 A1* | 6/2012 | Dahi | H04N 5/23254 348/47 |
| 2012/0235893 A1 | 9/2012 | Phillips et al. | |
| 2012/0242687 A1 | 9/2012 | Choi | |
| 2013/0058532 A1* | 3/2013 | White | A63B 24/0003 382/103 |
| 2014/0002419 A1* | 1/2014 | Thorson | G06F 3/147 345/175 |
| 2014/0042293 A1* | 2/2014 | Mok | G06F 1/1652 248/682 |
| 2014/0168422 A1* | 6/2014 | Feng | H04N 5/2252 348/135 |
| 2014/0342344 A1* | 11/2014 | Lee | G09B 5/06 434/365 |
| 2015/0161773 A1* | 6/2015 | Takahashi | H04N 5/2171 382/173 |
| 2015/0310594 A1* | 10/2015 | Olsson | G06T 5/50 382/263 |

FOREIGN PATENT DOCUMENTS

| | | |
|---|---|---|
| EP | 2 416 292 A1 | 2/2012 |
| EP | 2 500 894 A1 | 9/2012 |
| JP | 2005-249432 A | 9/2005 |
| JP | 2011-95370 A | 5/2011 |
| JP | 2012-532804 A | 12/2012 |
| KR | 10-2010-0050318 A | 5/2010 |
| KR | 10-2013-0019317 A | 2/2013 |
| TW | 200903309 | 1/2009 |

OTHER PUBLICATIONS

EPO Office action dated Feb. 9, 2016, for corresponding European Patent application 14163274.5, (9 pages).

* cited by examiner

OPTICAL DETECTION OF BENDING MOTIONS OF A FLEXIBLE DISPLAY

CROSS-REFERENCE TO RELATED APPLICATION(S)

This utility patent application claims priority to and the benefit of U.S. Provisional Application Ser. No. 61/807,669, filed Apr. 2, 2013, entitled Optical Detection of Bending Motions of Flexible Display, the entire content of which is incorporated herein by reference.

BACKGROUND

1. Field

An aspect of embodiments of the present invention relates generally to the detection of the bending motions of a flexible display, and the measurement of the bend angles over time.

2. Description of the Related Art

Flexible displays, such as flexible organic light emitting diode displays, are the next frontier in display technology. The new form-factor of flexible displays creates a number of new usage cases and applications, such as twist-based user inputs. However, to effectively perform such operations, it is useful for the system of the flexible display to calculate the extent, amount, and/or degree of bending or twisting of the display. Furthermore, information on the amount of bending could be utilized for life-time stress diagnostics of the flexible display.

SUMMARY

To measure the amount of bending along a X-axis and a Y-axis of a flexible display, a device may identify distinguishing factors between a reference condition of the flexible display (e.g., the reference condition of the flexible display being when the flexible display is flat and unbent) and a dynamic condition of the flexible display (e.g., when the flexible display is bent or curved). Although exemplary embodiments of the present invention refer to the reference condition as a state when the flexible display is flat and unbent, other embodiments of the present invention allow for the reference condition to be when the flexible display is bent. Accordingly, the reference condition and the dynamic condition may be any two conditions where the flexible display is differently bent, including a situation where one of the two conditions is unbent. Possible factors that may be considered to distinguish the reference condition from the dynamic condition may include, for example, mechanical stress experienced by components of the flexibly display, a surface pressure of the flexible display, detection of motion using a gyroscope, measurement of acceleration of one or more portions of the flexible display, and/or changes in light absorption or light perceived by the flexible display.

The described technology provides a flexible display capable of measuring a degree of bending of the display.

Embodiments of the present invention utilize multiple image sensors as part of a detection device embedded in or near a flexible display. As the flexible display is bent, the lines of sight of the image sensors change. By using the image sensors to capture images of the environmental surroundings, and by comparing distinctive features of the images over time using the detection device's processor/computing devices, a system of an embodiment of the present invention can measure the angular changes in the lines-of-sight of the image sensors, and can thereafter extrapolate the changing shape of the flexible display.

According to one embodiment of the present invention, there is provided a detection device of a flexible display, the detection device including image sensors "A" and "B" configured to capture images, a processor configured to process the images captured by the image sensors, and a memory having instructions stored therein that, when executed by the processor, result in calculation of a bend angle of the flexible display by comparing the images.

The detection device may further include a buffer configured to store the images captured by the image sensors, and configured to provide first-in-time images of the images captured at a first time, and second-in-time images of the images captured at a second time after the first time, to the processor, and the processor may be further configured to compare the first-in-time images to the second-in-time images to calculate the bend angle by executing the instructions in the memory.

The processor may be configured to compare the first-in-time images to the second-in-time images by locating a distinctive feature commonly found in each of an image-sensor-A image of the first-in-time images and an image-sensor-A image of the second-in-time images, both of which being captured by the image sensor "A", and in each of an image-sensor-B image of the first-in-time images and an image-sensor-B image of the second-in-time images, both of which being captured by the image sensor "B", marking a set of second coordinates of the distinctive feature for each of the second-in-time images, marking a set of first coordinates of the distinctive feature for each of the first-in-time images, calculating a first vector corresponding to a first distance and direction from the set of first coordinates of the image-sensor-A images to the set of second coordinates of the image-sensor-A images, and calculating a second vector corresponding to a second distance and direction from the set of first coordinates of the image-sensor-B images to the set of second coordinates of the image-sensor-B images.

Each of the coordinates may correspond to an X-Y coordinate system.

The processor may be configured to compare the first-in-time images to the second-in-time images by locating a plurality of distinctive features commonly found in each of an image-sensor-A image of the first-in-time images and an image-sensor-A image of the second-in-time images, both of which being captured by the image sensor "A", and in each of an image-sensor-B image of the first-in-time images and an image-sensor-B image of the second-in-time images, both of which being captured by the image sensor "B", marking a set of second coordinates for each of the distinctive features in each of the second-in-time images, marking a set of first coordinates for each of the distinctive features in each of the first-in-time images, for each of the distinctive features of the image-sensor-A images, calculating a first-image-sensor motion vector corresponding to a first distance and direction from one of the sets of first coordinates of the image-sensor-A images to a corresponding set of second coordinates of the image-sensor-A images, for each of the distinctive features of the image-sensor-B images, calculating a second-image-sensor motion vector corresponding to a second distance and direction from one of the sets of first coordinates of the image-sensor-B images to a corresponding set of second coordinates of the image-sensor-B images, calculating a first-image-sensor minimum mean-square error (MMSE) motion vector with a minimum mean-square error corresponding to a quadratic best-fit of the first-image-sensor motion vectors, and calculating a second-imagesensor MMSE motion vector with a minimum mean-square error corresponding to a quadratic best-fit of the second-image-sensor motion vectors.

The detection device may further include an arithmetic unit that is configured to receive the first-image-sensor MMSE motion vector and the second-image-sensor MMSE motion vector, calculate an arithmetic average of the first-image-sensor MMSE motion vector and the second-image-sensor MMSE motion vector, subtract the arithmetic average from the first-image-sensor MMSE motion vector to generate a first-image-sensor differential motion vector, and subtract the arithmetic average from the second-image-sensor MMSE motion vector to generate a second-image-sensor differential motion vector.

Generating the differential motion vectors may negate common movement of the image sensors with respect to an environmental area corresponding to the distinctive features. A common movement may include, for example, a lateral movement of the flexible display.

The detection device may further include a geometric unit configured to receive the differential motion vectors from the arithmetic unit, measure a number of pixels corresponding to a length of each of the differential motion vectors, convert the measured numbers of pixels into corresponding angles of deflection of a line-of-sight of each of the image sensors with respect to a front-surface normal of the flexible display, and map the angles of deflection as a function of time. The geometric unit may also calculate the projection of the angles of deflection onto the front-surface plane of the flexible display in obtaining the angles of bending along the X-axis and the Y-axis of the flexible display as a function of time.

The instructions stored in the memory, when executed by the processor, may cause the processor to process information as a result of the mapped angles, and the angles may correspond to X angles measured with respect to an X-axis and Y angles measured with respect to a Y-axis.

The image sensors may be on a periphery of a flexible display.

According to another embodiment of the present invention, there is provided a detection device including one or more image sensors configured to capture images, wherein the detection device is configured to detect bending or movement of the flexible display by analyzing the images captured by the one or more image sensors.

The detection device may be configured to calculate a degree of the detected bending by storing first-in-time images of the images captured at a first time and by storing second-in-time images of the images captured at a second time after the first time, and comparing the first-in-time images to respective ones of the second-in-time images captured by a same one of the image sensors to determine an angle that the one or more of the image sensors has moved with respect to a reference point.

According to another embodiment of the present invention, there is provided a method of detecting a bending of a flexible display, the method including capturing a plurality of first-in-time images at a first time using a plurality of image sensors, capturing a plurality of second-in-time images at a second time using the plurality of image sensors, the second time being after the first time, and comparing the first-in-time images to the second-in-time images of corresponding ones of the image sensors.

Comparing the first-in-time images to the second-in-time images may include executing instructions stored in a memory using a processor.

The method may further include determining an angle corresponding to a change in a line-of-sight of one of the image sensors relative to a reference point of the flexible display from the first time to the second time according to the comparing of the first-in-time images to the second-in-time images, and calculating a bend angle of the flexible display corresponding to the change in the line-of-sight.

The method may further include mapping a plurality of calculated bend angles over time to determine lifetime stress diagnostics.

Comparing the first-in-time images to the second-in-time images may include locating one or more distinctive features commonly found in the first-in-time images and the second-in-time images, marking a set of second coordinates for each of the one or more distinctive features in the second-in-time images, marking a set of first coordinates for each of the one or more distinctive features in the first-in-time images, and calculating, for each of the distinctive features of the images of each of the image sensors, a motion vector corresponding to a distance between each set of the first coordinates and a respective set of the second coordinates.

A plurality of motion vectors may be calculated, and comparing the first-in-time images to the second-in-time images may further include calculating, for each of the image sensors, a minimum mean-square error (MMSE) motion vector with a minimum mean-square error representing a quadratic best-fit of the motion vectors.

Comparing the first-in-time images to the second-in-time images may further include calculating an arithmetic average of all of the MMSE motion vectors, and subtracting the arithmetic average from each of the MMSE motion vectors to generate a differential motion vector for each of the image sensors, thereby negating common movement of the image sensors.

The method may further include calculating one or more angles of deflection in the lines-of-sight of the image sensors with respect to the front-surface normal of the flexible display by measuring a number of pixels in one or more axes corresponding to a length of each of the differential motion vectors, converting the numbers of pixels in the one or more axes into the one or more angles of deflection based on the number of pixels per degree of field of view of each of the image sensors, and mapping the angles of deflection as a function of time. The method may also calculate the projection of the angles of deflection onto the front-surface plane of the flexible display in obtaining the angles of bending along the X-axis and the Y-axis of the flexible display as a function of time.

Accordingly, embodiments of the present invention can measure the amount of bending along the X-axis and the Y-axis (e.g., X-dimensional bending and Y-dimensional bending) of the flexible display.

DETAILED DESCRIPTION

Hereinafter, exemplary embodiments of the present invention will be described in detail with reference to the accompanying drawings so that a person of ordinary skill in the art may perform embodiments of the present invention. The drawings and description are to be regarded as illustrative in nature, and not restrictive. Like reference numerals designate like elements throughout the specification.

As those skilled in the art would realize, the described embodiments may be modified in various ways, all without departing from the spirit or scope of the present invention. That is, the described embodiments of the present invention may be embodied in different forms, and should not be construed as limited to the embodiments set forth herein. Rather, these embodiments are provided so that this disclosure will be thorough and complete, and will fully convey the scope of the example embodiments to those skilled in the art.

In the drawings, dimensions may be exaggerated for clarity of illustration. It will be understood that when an element is referred to as being "between" two elements, it may be the only element between the two elements, or one or more intervening elements may also be present. Like reference numerals refer to like elements throughout.

Further, when a first element is described as being coupled to a second element, the first element may be directly coupled to the second element, or may be indirectly coupled to the second element via one or more other elements. Also, some of the elements that are not essential to the complete understanding of the invention are omitted for clarity. Also, like reference numerals refer to like elements throughout.

Further, the use of "may" when describing embodiments of the present invention refers to "one or more embodiments of the present invention." In a similar fashion, the use of example language, such as "for example," "such as," and "e.g." when describing embodiments of the present invention refers to "one or more embodiments of the present invention" for each of the corresponding items listed. In addition, the use of alternate language, such as "or," when describing embodiments of the present invention refers to "one or more embodiments of the present invention" for each corresponding item listed, while "and/or" refers to "one or more embodiments of the present invention" for every combination of one or more of the corresponding items listed.

As described above, a detection device in a flexible display can calculate or estimate a degree to which the flexible display is bent, including in which direction the flexible display is bent, by comparing a reference condition to a dynamic condition. Embodiments of the present invention distinguish the reference condition from the dynamic condition by imaging environmental surroundings.

That is, embodiments of the present invention visually detect the environment near the flexible display (e.g., environmental surroundings) while the flexible display is in a first condition (e.g. the reference condition), then visually detect the environment near the flexible display during a second condition subsequent of the first condition (e.g. the dynamic condition), and then compare the results of the different detections to calculate an amount of bending along the X-axis and the Y-axis of the flexible display. The visual detection of the environment may be performed by detecting distinctive features of the environment that are captured by image sensors.

By detecting the bend angles of the flexible display (e.g., the bend angles of the display screen, or the front-surface plane, of the flexible display) of the device of embodiments of the present invention, the information regarding the degree of bending can be used to cause the detection device to take an action.

For example, upon detecting a degree of bending, the detection device can adjust the brightness of the display to counteract glare. As another example, after the flexible display has been bent an approximate number of times, or to a certain degree an approximate number of times, the light emitting elements of the flexible display may, on average, degrade such that a different amount of electrical current may be required to cause a degraded pixel to emit light of a same brightness of a non-degraded pixel. By tracking and storing information relating to the bending of the flexible display, compensation schemes can be introduced to compensate for the stressed areas (e.g., by providing a larger electrical current to areas of the flexible display expected to have pixels that are degraded to a higher degree). Accordingly, the detection device according to embodiments of the present invention allows for lifetime stress diagnostics.

Additionally, motion-based, or twist-based commands can be measured by the detection device of the present embodiments, which can allow a user to interact with the information provided on the flexible display by using such commands. Such interaction may include advancing a page in an electronic book or article, going back to a previous webpage, or various user commands corresponding to a video game shown on the flexible display.

Accordingly, embodiments of the present invention can measure the location, degree, amount, and/or direction of bending of the flexible display by imaging the environmental surroundings.

Figure 1:
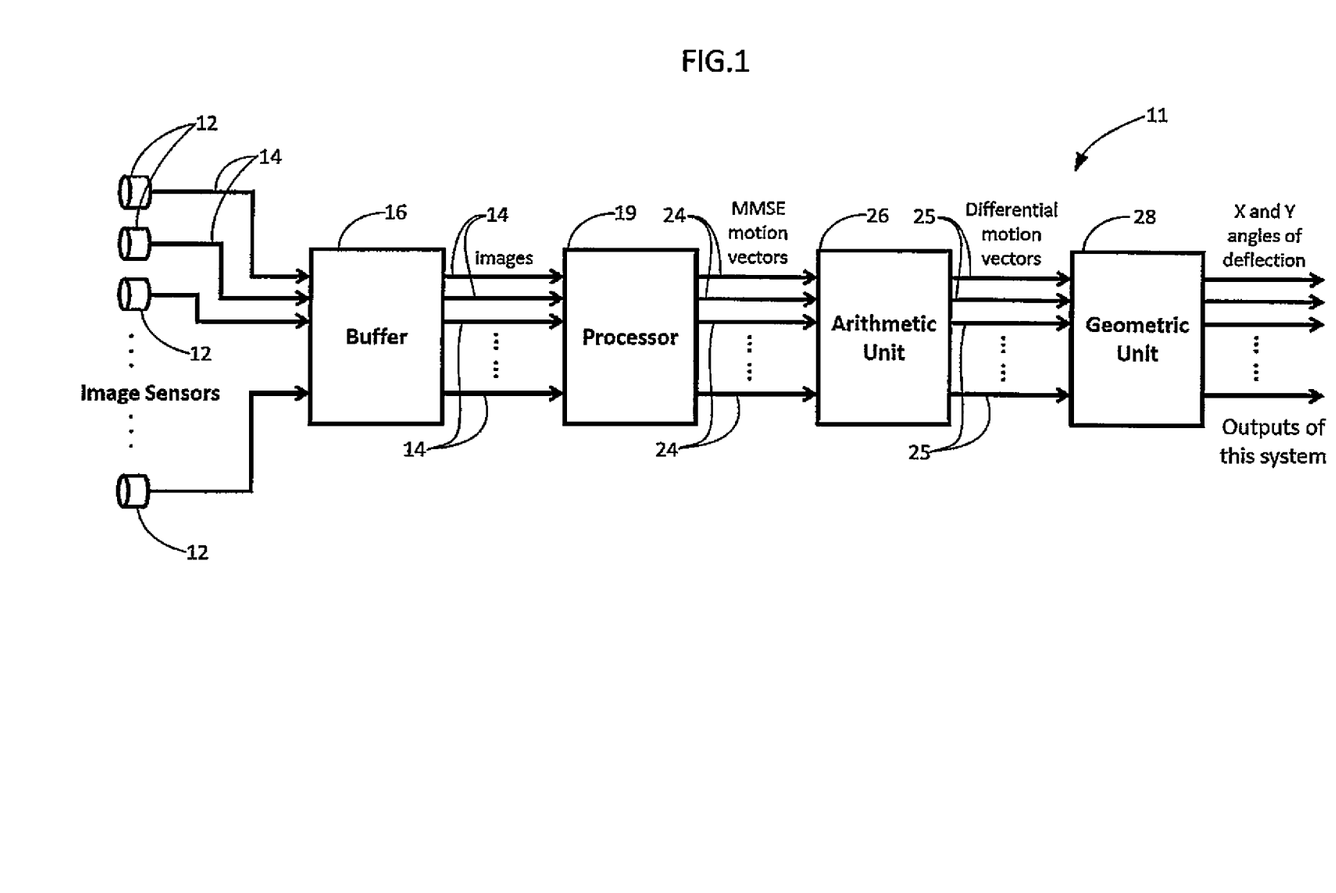
FIG. 1 is a block diagram depicting various components of a detection device of a flexible display, according to an embodiment of the present invention.
Figure 2A:
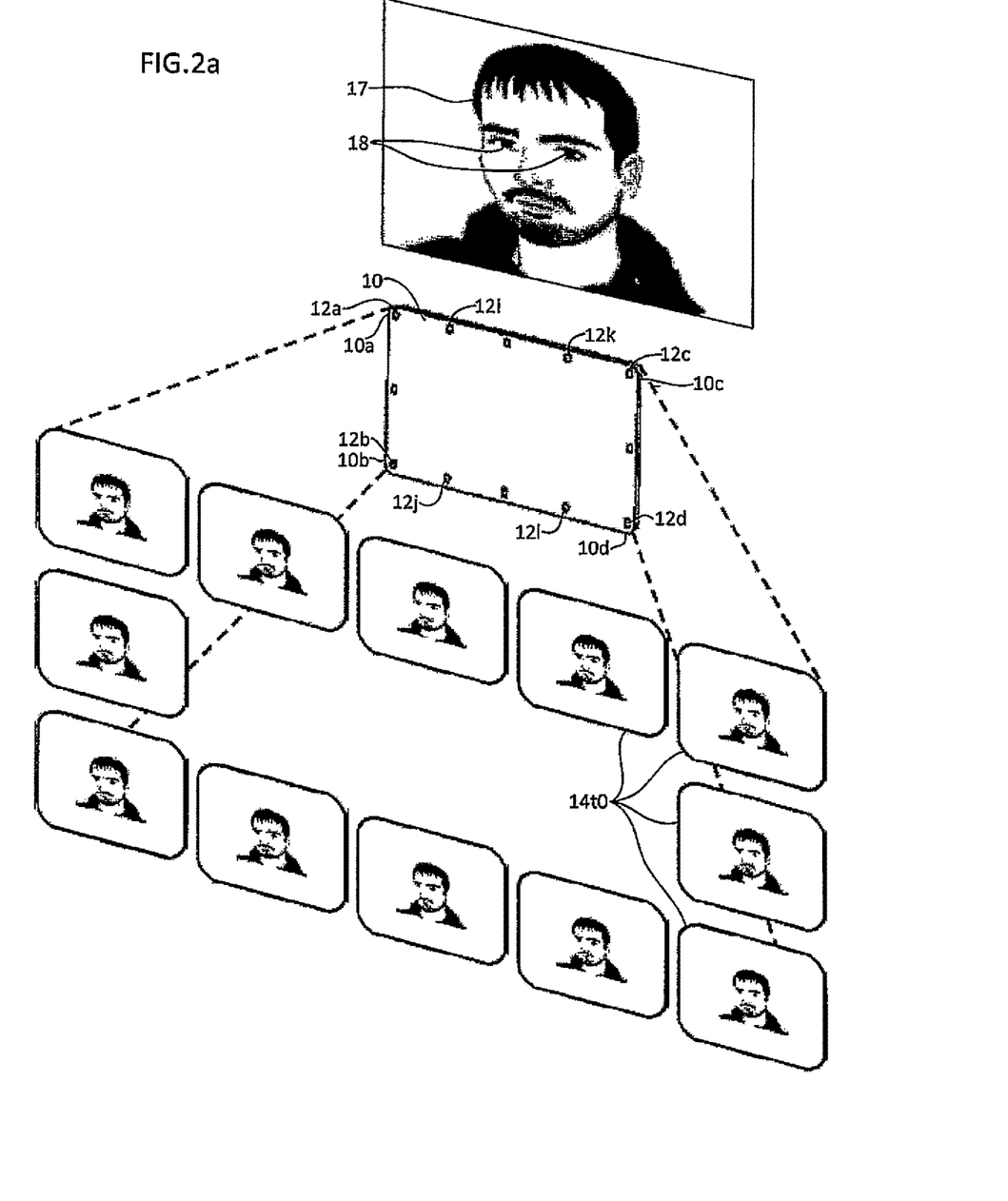
FIG. 2a is a conceptual diagram representing a flexible display shown in a flat, unbent state, wherein various images of a subject are captured by corresponding image sensors of the detection device, according to an embodiment of the present invention.
Figure 2B:
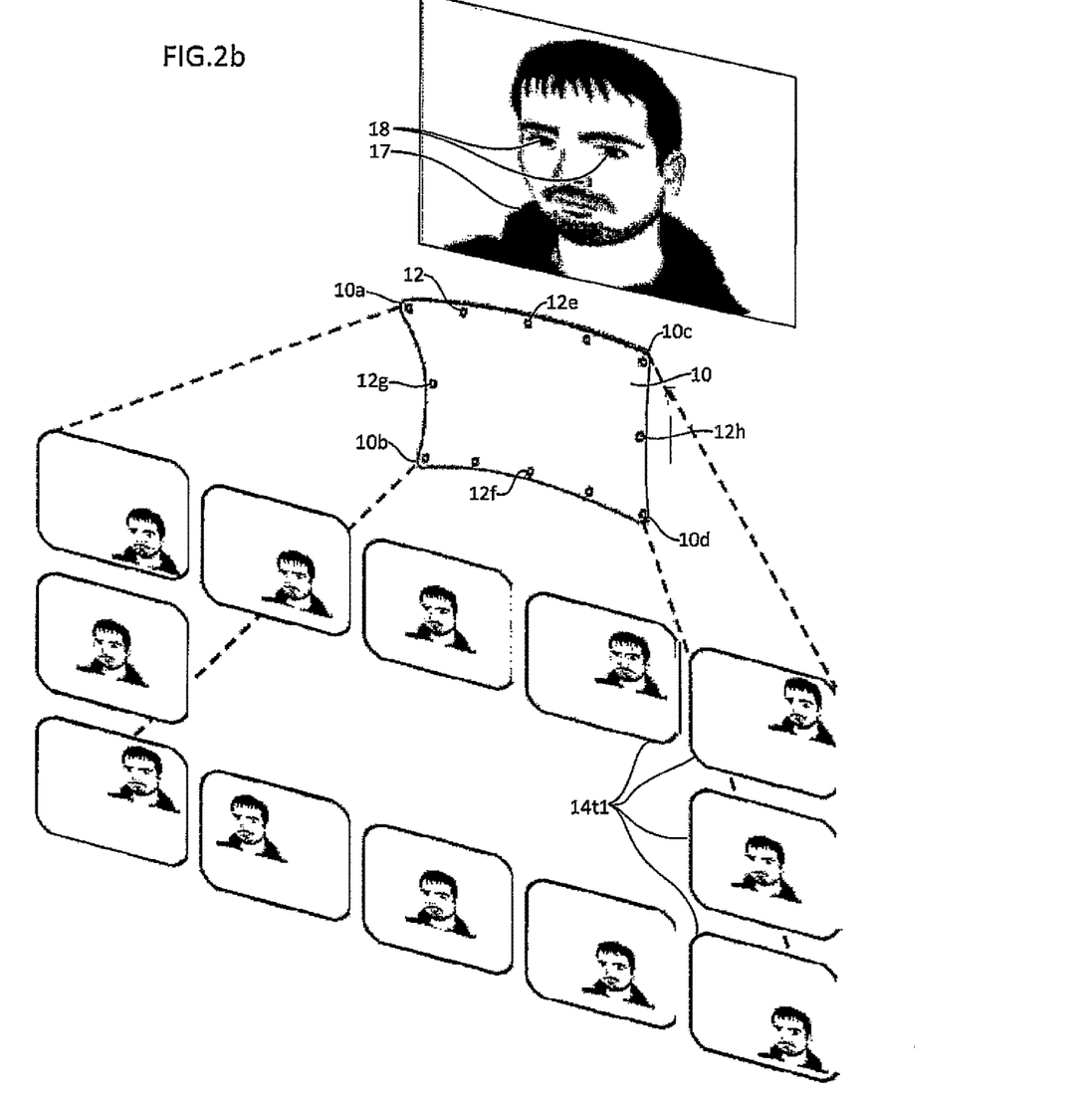
FIG. 2b is a conceptual diagram representing the flexible display shown in curved/bent state, wherein various images of the subject are captured by corresponding image sensors of the detection system, according to an embodiment of the present invention.
Figure 3:
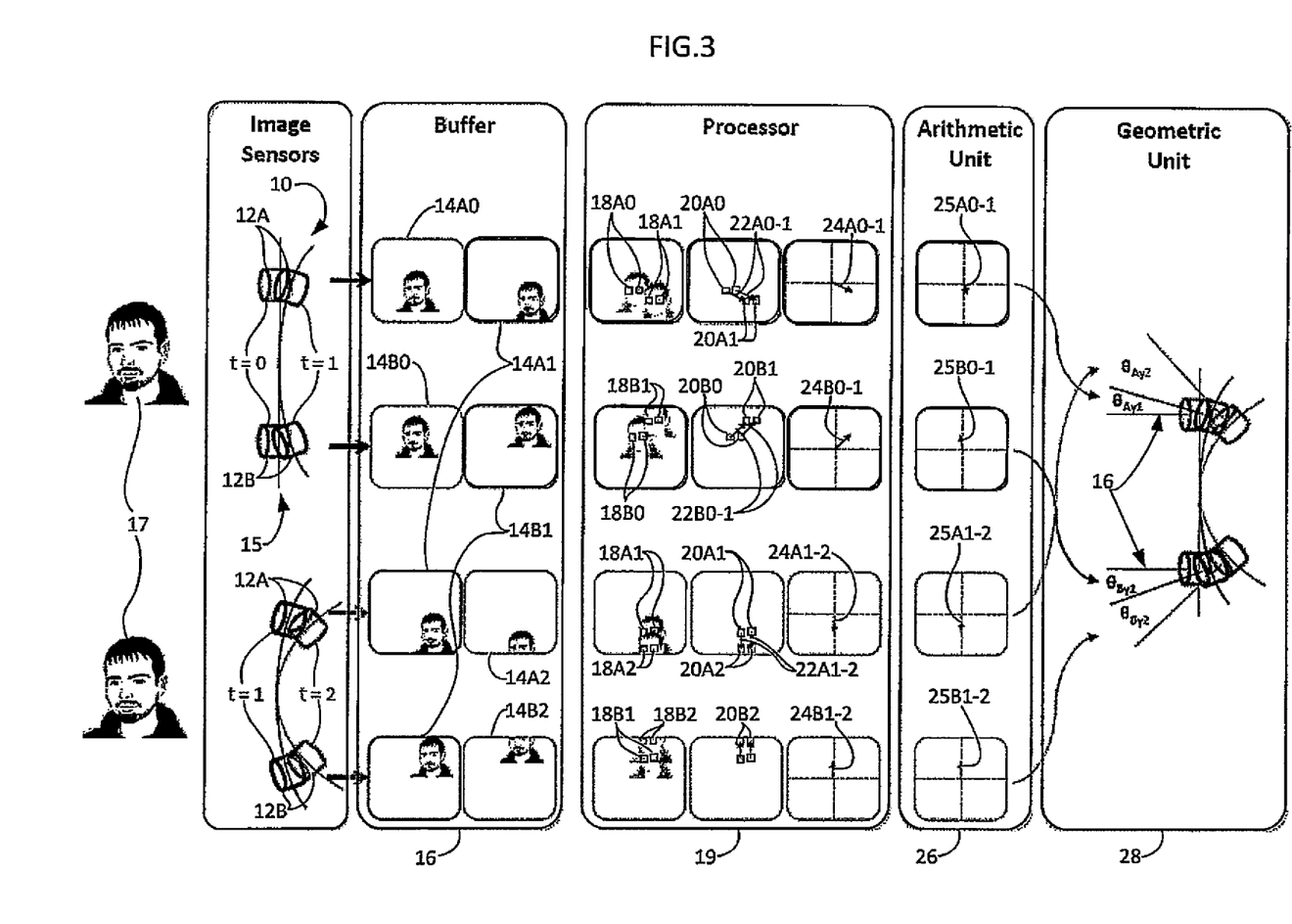
FIG. 3 depicts images captured by each of a pair of image sensors at three different times, and how information of the images is used by various components of a detection device to calculate a bend angle of the flexible display, according to an embodiment of the present invention.

FIG. 1 is a block diagram for depicting various components of the detection device of a flexible display, according to an embodiment of the present invention. In embodiment of the present invention, the detection device may reside in the flexible display, and may or may not be integrated with the various circuitry and/or internal components of the flexible display. Referring to FIG. 1, the detection device 11 of the present embodiment contains the following components:

1) One or more image sensors 12, which may be embedded within the flexible display 10, that each capture an image 14 of the surrounding environment (e.g., each image sensor 12 can capture an image taken of a portion of the environment). In the present embodiment, the image sensors 12 are separated at regular intervals, and are embedded along a perimeter of the flexible display 10, although the image sensors 12 may be alternately located in other embodiments of the present invention;

2) A buffer 16 to store the various images. For the purpose of describing the present embodiment, the images 14 taken at a first time (e.g., at a time t=0) are images 14t0 (see FIG. 2a) and the images taken at a later, second time (e.g., at a time t=1) are images 14t1 (see FIG. 2b). The captured images 14 may be of a person 17. For example, as shown in FIGS. 2a and 2b, the images 14 are of a person 17 that is in front of the image sensors 12, the images 14 also including a landmark/distinctive feature 18 used by the detection device 11 as a reference point of the surrounding environment (e.g., the eyes of the subject 17), although other embodiments may use other structures and images as the reference point;

3) A processor 19 to identify one or more distinctive features 18 present in each of the images 14 of the first and second times for each image sensor 12, and to mark a corresponding set of X-Y coordinates 20 (see FIG. 3) for each of the distinctive features 18, for each image sensor 12, and for each time. The processor 19 is also used to calculate a motion vector 22 for each distinctive feature 18 for each of the image sensors 12, the motion vectors 22 corresponding to a distance between respective ones of the X-Y coordinates 20 of the first-in-time images 14t0 and ones of the X-Y coordinates 20 of the second-in-time images 14t1. Additionally, the processor 19 is used to calculate an MMSE motion vector 24 with the minimum mean-square error to represent a best-fit vector (e.g., a quadratic best-fit vector) of all of the calculated motion vectors 22;

4) An arithmetic unit 26 to calculate the arithmetic average of all of the calculated MMSE motion vectors 24 from the image sensors 12, to subtract the arithmetic average from each of the MMSE motion vectors 24, thereby negating any lateral movement of the flexible display between from the time the first-in-time images 14t0 are captured and the time the second-in-time images 14t1 are captured (e.g., to remove the effects of all of the image sensors 12 collectively moving with respect to the distinctive features 18 between the two times), and to thereby generate a differential motion vector 25 for each of the MMSE motion vectors 24; and 5) A geometric unit 28 to measure the numbers of pixels in the X and Y axes of the differential motion vectors 25, based on the number of pixels per degree of field of view of the image sensors 12, which corresponds to the number of pixels by which the distinctive feature(s) 18 of the subject/environment 17 moved from a corresponding first-in-time image 14t0 to a corresponding second-in-time image 14t1, to convert the numbers of pixels in the X and Y axes of the differential motion vectors 25 to the angles of deflection (e.g., angles $\theta_{Ay1}$, $\theta_{Ay2}$, $\theta_{By1}$, and $\theta_{By2}$, shown in FIG. 3) of the image sensors 12 with respect to the front-surface normal 16, which is perpendicular to front-surface plane 15 of the unbent flexible display 10 (see FIG. 3), and to map the angles of deflection to their corresponding image sensors 12 locations as a function of time (note that, for ease of description, FIG. 3 depicts only the deflections in one direction, although the image sensors may also undergo deflections in multiple directions). Although the angles calculated in the present embodiment correspond to a change in the line-of-sight of the image sensors 12 with respect to the front-surface normal of the flexible display 10, other angles may be calculated according to other embodiments of the present invention, such as an angle(s) corresponding to a change in the line-of-sight of the image sensors 12 with respect to a reference point of the display, or an angle(s) corresponding to a change in the line-of-sight of one of the image sensors 12 with respect to another one of the image sensors 12.

Although, in the present embodiment, the processor 19 is listed separately from the arithmetic unit 26 and the geometric unit 28, in other embodiments of the present invention, the arithmetic unit and the geometric unit may be considered as part of, or as subunits of, the processor. Furthermore, the processor and other various components of the detection device 11 of embodiments of the present invention may operate by using a memory having instructions, or software code, that are executed by the processor, the arithmetic unit, the geometric unit, etc.

The angles of deflection (e.g., angles $\theta_{Ay1}$, $\theta_{Ay2}$, $\theta_{By1}$, and $\theta_{By2}$, shown in FIG. 3) represent the bending of the flexible display 10 with respect to the lines-of-sight of the image sensors 12. Accordingly, with a sufficient number of image sensors 12, and with a sufficient number of adequately captured images 14, embodiments of the present invention can measure or estimate the changing shape of the flexible display 10 over time.

FIG. 2a is a conceptual diagram representing a flexible display 10 shown in a flat, unbent state, wherein images of a subject/environment are detected by corresponding image sensors of the detection device 11, according to an embodiment of the present invention. FIG. 2b is a conceptual diagram representing the flexible display 10 shown in curved/bent state, wherein images of the subject/environment are detected by the corresponding image sensors of the detection device 11, according to the embodiment shown in FIG. 2a. In describing the present embodiment, the flat, unbent state of the flexible display of the present embodiment will be referred to as a reference condition, and the bent state of the flexible display of the present invention will be referred to as a dynamic condition.

Referring to FIG. 2a, when the flexible display 10 is in a flat state (e.g., the reference condition), there is no bend angle in the flexible display 10. That is, the angles of deflection (e.g., angles $\theta_{Ay1}$, $\theta_{Ay2}$, $\theta_{By1}$, and $\theta_{By2}$, shown in FIG. 3) in the line-of-sight of image sensors 12 with respect to front-surface normal 16 of the flexible display are equal to approximately zero degree. In the present embodiment the angles of deflection are formed between the respective lines-of-sight of the image sensors 12 and the front-surface normal 16 of the unbent flexible display 10, such that the angles of deflection are approximately zero degrees when the flexible display 10 is in the flat unbent state. For the purpose of description of the present embodiment, the flexible display 10 in the flat state will provide an example of the image sensors 12 capturing the first-in-time images 14t0. Furthermore, the image sensors 12 in FIGS. 2a and 2b will be located on the side of the flexible display 10 closest to the subject 17 (e.g., the image sensors 12 will be directly on the other side of the points referenced by the various versions of the reference character 12).

When the flexible display 10 is in the flat state, and when there is sufficient distance between the image sensors 12 and the subject 17, because the line of sight of each of the image sensors 12 will be substantially parallel to one another, the various images 14 of the subject 17 captured by the image sensors 12 will be relatively the same. That is, the location of the image of the subject in the frame of each of the images 14 will be relatively the same for each of the image sensors 12. Furthermore, the one or more distinctive features 18 (e.g., the eyes of the subject 17) will be located at approximately the same X and Y coordinates 20 corresponding to each of images 14 captured by the image sensors 12. Although the present embodiment of the invention uses an X-Y coordinate system for mapping the coordinates 20, other embodiments of the present invention may use other coordinate systems, such as, for example, a Cartesian coordinate system, or a polar coordinate system.

In the present embodiment, as depicted in FIGS. 2a and 2b, the flexible display 10 includes twelve image sensors 12. Accordingly, twelve images 14 are shown in an arrangement similar to that of the twelve image sensors 12 to provide a representation of each of the images 14 captured by each of the image sensors 12. It should be noted that although the present embodiment depicts twelve image sensors 12, other embodiments of the present invention may include as few as one image sensor or more than twelve image sensors. Furthermore, although the present embodiment depicts a rectangular flexible display 10, the shape of the flexible display 10 is not so limited, and the flexible display of other embodiments may have other suitable shapes.

In the present embodiment, the image sensors 12 are shown to be at, or near, the perimeter of the flexible display 10. Although other embodiments of the present invention may include image sensors 12 that are differently located (e.g., the image sensors 12 may be in the screen of the flexible display 10), by having the image sensors 12 at/near the perimeter, bends in the flexible display 10 will result in greater changes of the line-of-sight of the image sensors 12 due to their distance from the center of the flexible display 10, thereby allowing for more accurate calculation of the bend angles of the flexible display 10. That is, the greater the spatial separation between adjacent ones of the image sensors 12, the greater the resolution of the bend angle detection.

The subject 17 contains the distinctive feature(s) 18 found in each of the first-in-time images 14*t*0 and in each of the second-in-time images 14*t*1, and the locations of the distinctive feature(s) 18 will be compared for purposes of determining the relative change of the bend angle(s) θ (e.g., angles of deflection $\theta_{Ay1}$, $\theta_{Ay2}$, $\theta_{By1}$, and $\theta_{By2}$ along the Y-axis of the flexible display, shown in FIG. 3).

Furthermore, the landmarks, or distinctive feature(s) 18 to be analyzed must be viewable by the image sensors 12 at both of the time of the first-in-time images 14*t*0 (e.g., time t=0 in FIG. 3) and the time of the second-in-time images 14*t*1 (e.g., time t=1 in FIG. 3). In the present embodiment, more accurate calculation of the bend angles can be achieved if the distinctive feature(s) 18 are present in each of the images 14 for each of the image sensors 12, because errors in calculation may occur if different ones of the image sensors 12 were to analyze different landmarks/distinctive features 18 as a common distinctive feature/set of features.

Furthermore, each image sensor 12 is measuring in a two-dimensional plane (that is, each image sensor 12 by itself captures a two-dimensional image 14 representing a three-dimensional environment without being able to accurately capture depth). Accordingly, a common reference point (e.g., the analyzed distinctive feature 18) can give the collectively captured images 14 three-dimensional significance.

Further, as will be known to one of ordinary skill in the art, formulas and algorithms can be used to convert calculated vectors to angles. Such formulas and algorithms can be used in embodiments of the present invention to convert the images 14 captured by the image sensors 12 to produce information corresponding to a distance from the distinctive features 18 to the image sensors 12.

Referring to FIG. 2*b*, the flexible display 10 of the present embodiment is shown in a bent state, which will be referred to as the dynamic condition for the purpose of description of the present embodiment. When the flexible display 10 is in the bent state, the various lines-of-sight of the image sensors 12 may form an angle (e.g., an angle corresponding to the calculated angle θ) with respect to the front-surface normal 16 of the flexible display 10 in the flat state (see FIG. 3).

The lines-of-sight of different ones of the image sensors 12 with respect to others of the image sensors 12 will correspond to the location(s) of the bend(s) of the flexible display 10. Because of the relative changes in the lines-of-sight, the ones of the image sensors 12 that have changed their line-of-sight with respect to the subject 17 will perceive the subject 17 as being differently located in the frame of the image 14 when compared to the images 14 corresponding to the reference condition (e.g., the images 14*t*0 shown in FIG. 2*a*).

For example, in FIG. 2*b*, the upper left corner 10*a* and the lower left corner 10*b* of the flexible display 10 are depicted as being bent away from the subject 17 (e.g., the upper and lower left corners 10*a* and 10*b* are pulled back with respect to the front-surface normal 16, which is perpendicular to the front-surface plane 15 of the display 10 in the unbent state). Accordingly, the second-in-time images 14*t*1 captured by the image sensors 12*a* and 12*b* that are respectively near the upper left and lower left corners 10*a* and 10*b* are perceived as moving toward the lower right corner and toward the upper right corner, respectively, when compared to the first-in-time images 14*t*0 captured by these image sensors 12*a* and 12*b*. Similarly, the image sensors 12*i* and 12*j* that are respectively immediately to the right of the image sensors 12*a* and 12*b* near the upper left and lower left corners 10*a* and 10*b* also perceive the subject 17 of the respective images 14 as moving toward the lower right corner and the upper right corner of the images 14, respectively, when compared to the first-in-time images 14*t*0 captured by these image sensors 12, albeit by not as much as the subject 17 of the images 14 captured by the image sensors 12*a* and 12*b* near the upper left and lower left corners 10*a* and 10*b*. This is because the angle of deflection from the front-surface normal 16 of the flexible display 10 is higher for the image sensors 12 further from the center of the flexible display 10.

That is, the disparity in the change in the coordinates of the subject 17 in the captured images 14 (e.g., the coordinates 20 of the distinctive features 18 in FIG. 3) is due to the fact that the image sensors 12 at the extremities of the bent flexible display 10 (e.g., the image sensors 12 near the upper left and lower left corners 10*a* and 10*b*) will have a greater change in the angle of their line-of-sight than will the image sensors 12 closer to the center of the display 10 (e.g., the image sensors 12 immediately to the right of the image sensors 12 near the upper left and lower left corners 10*a* and 10*b*), assuming the center of the display 10 is not moved or tilted with respect to the subject 17 (as shown in FIGS. 2*a* and 2*b*).

For example, the subject 17 in the images 14 corresponding to each of the top middle image sensor 12*e*, the bottom middle image sensor 12*f*, the left middle image sensor 12*g*, and the right middle image sensor 12*h* is shown in the center of the captured image 14 in both FIGS. 2*a* and 2*b*, thereby indicating that the corners of the display 10 are bent in FIG. 2*b*, while the lateral sides of the flexible display 10 are relatively unbent. Accordingly, the lines-of-sight of the image sensors 12*e*, 12*f*, 12*g*, and 12*h* are relatively unchanged from the time t=0 corresponding to FIG. 2*a* to the time t=1 corresponding to FIG. 2*b*.

Unlike the upper left corner 10*a* and the lower left corner 10*b*, the upper right corner 10*c* and the lower right corner 10*d* of the flexible display 10 are bent toward the subject 17. Accordingly, the subject 17 in the second-in-time images 14*t*1 captured by the image sensors 12*c* and 12*d* that are respectively near the upper right and lower right corners 10*c* and 10*d* are respectively moved up and to the right, and down and to the right, when compared to the first-in-time images 14*t*0 captured by these image sensors 12. The second-in-time images 14*t*1 captured by the image sensors 12*k* and 12*l* that are respectively immediately to the left of the image sensors 12 near the upper right and lower right corners 10c and 10d of the flexible display 10 are similarly moved when compared to their previously captured images 14t0 (e.g., the images captured first in time, or the first-in-time images), albeit to a lesser degree when compared to the images 14 captured by the image sensors at corners 10c and 10d.

Once the first-in-time and second-in-time images 14 are captured by the image sensors 12, the buffer 16 of the detection device 11 of the present embodiment stores the first-in-time and second-in-time images 14 for processing by the processor 19. The processor 19 will be capable of processing the first-in-time and second-in-time images 14 for each of the image sensors 12. However, for the sake of convenience, the processing by the processor 19 of the present embodiment will be described with respect to two of the image sensors 12 (i.e., image sensors 12A and 12B in FIG. 3).

FIG. 3 demonstrates the capturing of images at three times (e.g., time t=0, t=1, and t=2, which respectively correspond to first-in-time images, second-in-time images, and third-in-time images), and demonstrates the actions taken by the processor 19, the arithmetic unit 26, and the geometric unit 28 when comparing images 14 captured at time t=0 to images 14 captured at time t=1, and when comparing images 14 captured at time t=1 to images 14 captured at time t=2. Accordingly, FIG. 3 depicts how information of the images 14 is used to calculate an angle of deflection θ of the flexible display 10, according to an embodiment of the present invention.

For purposes of describing the present embodiment, image 14A0 refers to the image captured by image sensor 12A at time t=0, image 14B0 refers to the image captured by image sensor 12B at time t=0, image 14A1 refers to the image captured by image sensor 12A at time t=1, image 14B1 refers to the image captured by image sensor 12B at time t=1, image 14A2 refers to the image captured by image sensor 12A at time t=2, and image 14B2 refers to the image captured by image sensor 12B at time t=2.

After the buffer 16 captures various images 14, the processor 19 determines if a sufficient distinctive feature(s) 18 can be found in the environment and/or subject 17 captured in each of the current and first-in-time images 14, and captured by each of the image sensors 12. The processor 19 of the present embodiment is capable of detecting distinctive features 18 by any one of methods known to those of ordinary skill in the art. For example, the processor 19 of the present embodiment may be equipped with image recognition software. That is, the processor 19 may be able to process a set of software instructions and/or computer code corresponding to image recognition and stored in a memory coupled to the processor 19. The image recognition software may be intended to detect contrast (e.g., color contrast) between a landmark (such as the subject 17, or such as a distinctive feature 18 of a subject 17) and an adjacent area, and/or to detect regions surrounding the distinctive feature 18. For example, when capturing an image of a person's face, the person's eye has a higher contrast when compared to the rest of the person's face, making the person's eye(s) an effective distinctive feature 18 of the subject 17. Other methods of image recognition use a contrast in color of the reference point/distinctive feature 18. Assuming the color and the relative position of the distinctive feature aren't changing, the software can recognize it as a landmark/reference point/distinctive feature 18.

Once the processor 19 has identified the distinctive feature(s) 18 of the environment and/or subject 17 in the captured images 14, the processor assigns an X-Y coordinate value 20 (e.g., a set of X and Y coordinates) to the location of the distinctive feature(s) 18 in the frames of both of the current and the first-in-time images 14. In the present embodiment, the X-Y coordinate values 20 correspond to the location of the distinctive feature(s) 18 captured by the image sensors 12 (e.g., if the image 14 captured by an image sensor 12 was displayed, the coordinate values 20 correspond to that which would be the coordinate relation of the distinctive feature(s) 18 with respect to the center of the display). In describing the present embodiment with reference to FIG. 3, the various coordinates 20 captured by the various image sensors 12 at various times are described in a fashion similar to the description of the various images 14A0, 14A1, and 14A2 (e.g., image-sensor-A images), and 14B0, 14B1, and 14B2 (e.g., image-sensor-B images). That is, coordinate values 20A0 correspond to the coordinate values of the distinctive features 18 of image 14A0, coordinate values 20B2 correspond to the coordinate values of the distinctive features 18 of image 14B2, etc.

Once the processor assigns the various X-Y coordinate values 20 of the distinctive features 18 of the first-in-time and second-in-time images 14, the processor calculates the motion vectors 22 corresponding to a difference between the X-Y coordinate values 20 of the distinctive features 18 in the first-in-time images 14 captured by each of the image sensors 12 and the X-Y coordinate values 20 of the distinctive features 18 in the second-in-time images 14 captured by the same ones of the image sensors 12. The different motion vectors 22 correspond to the change of the different coordinate values 20 from one time to the next time. In describing the present embodiment, the motion vector 22B0-1 corresponds to the distance between coordinate values 20B0 and 20B1, which corresponds to the change in position of the distinctive features 18B0 to 18B1 captured by image sensor 12B at times t=0 and t=1, respectively.

In the present embodiment, because the processor 19 has identified two distinctive features 18 (e.g., the eyes 18 of the subject 17) that are captured by each of the image sensors 12 in each of the first-in-time and second-in-time images 14, two motion vectors 22 are calculated for each image sensor 12 (e.g., a first motion vector, or left-side motion vector 22, corresponding to the perceived movement of the left eye as a distinctive feature 18, and a second motion vector, or right-side motion vector 22, corresponding to the perceived movement of the right eye as another distinctive feature 18).

Once the processor 19 calculates the motion vectors 22 from the differences between the previous X-Y coordinates 20A0, 20B0, which correspond to the first-in-time images, and respective ones of the current X-Y coordinates 20A1, 20B1, which correspond to the second-in-time images (e.g., an image-sensor-A motion vector 22A0-1 for the image sensor "A" 12A and an image-sensor-B motion vector 22B0-1 for the image sensor "B" 12B), the processor 19 calculates a minimum mean-square error (MMSE) motion vector 24 corresponding to a best-fit (e.g., quadratic best-fit) of all of the motion vectors 22 for each single image sensor 12 (e.g., an image-sensor-B minimum mean-square error (MMSE) motion vector 24B0-1 corresponding to a best-fit (e.g., quadratic best-fit) of the two motion vectors 22B0-1, which correspond to each of the distinctive images 18 in the images 14B0 and 14B1 captured by image sensor 12B, and a similarly calculated image-sensor-A minimum mean-square error (MMSE) motion vector 24A0-1). By calculating the MMSE motion vectors 24, the processor 19 is able to more accurately calculate the relative motion of the image sensors 12 with respect to the subject 17 having the distinctive features 18.

In the present embodiment, because the two distinctive features 18 have moved a distance equal to the other, the left-side and right-side motion vectors 22 of the respective times and image sensors 12 are equal, and therefore have an average equal thereto. Accordingly, the corresponding MMSE motion vector 24 is equal to each of the left-side and right-side motion vectors 22.

However, in other embodiments of the present invention, differently sized motion vectors 22 may result in a differently calculated MMSE motion vector 24. For example, if the subject 17 in the present example rotated his head with respect to the image sensors 12 from the previous time (t=0), which is first-in-time, to the current time (t=1), which is second-in-time, the two motion vectors 22B0-1 corresponding to the two eyes/distinctive features 18 might not be identical, and the corresponding MMSE motion vector 24B0-1 will correspond to a best-fit (e.g., quadratic best-fit) of the two separate motion vectors 22B0-1.

Although a plurality of motion vectors 22 are analyzed in the described example of the present embodiment, in other embodiments of the present invention, each image sensor 12 may correspond to a single motion vector 22 (e.g., a single distinctive feature 18, instead of two, may be analyzed), which in turn corresponds to a degree to which the line-of-sight of an image sensor 12 has changed with respect to the distinctive feature 18 of the subject 17 from the first-in-time image 14 to the second-in-time image 14. In such an embodiment, the MMSE motion vector 24 would be the same as the motion vector 22.

It should also be noted that the present invention is not limited to calculating the described MMSE motion vector(s) 24. Other embodiments of the present invention may use one or more other estimation methods to combine multiple vectors, such as the motion vector 22, into one vector. Such estimation methods may include, for example, averaging, minimum-variance estimation, and linear regression, as will be understood by one of ordinary skill in the art.

Once the processor 19 calculates the MMSE motion vector(s) 24, the information/data regarding each of the MMSE motion vectors 24 is delivered to the arithmetic unit 26. Then, the arithmetic unit 26 calculates an arithmetic average of the MMSE motion vectors 24 of all of the analyzed image sensors 12. Thereafter, the arithmetic unit 26 subtracts the arithmetic average of the MMSE motion vectors 24 to negate any lateral movement of the flexible display 10 with respect to the distinctive features 18 of the subject 17, and to thereby generate a differential motion vector 25 for each of the MMSE motion vectors 24.

Although the arithmetic unit 26 of the present embodiment calculates arithmetic average of the MMSE motion vectors 24, other embodiments of the present invention may utilize other methods of removing or negating lateral movement. Such methods may include, but are not limited to, truncation (i.e. removing common values between two data sets), or differentiation (i.e. taking derivatives of the two data sets), as will be known to one of ordinary skill in the art.

The arithmetic average of all of the MMSE motion vectors 24 will correspond to a common motion (e.g., a lateral motion) of the image sensors 12 with respect to the distinctive features 18 of the subject 17. For example, if the flexible display 10 is bent from the first-in-time/previous time to the second-in-time/current time (e.g., from time t=0 to time t=1) while the entire flexible display 10 also moves or rotates horizontally to the left, the distinctive features 18 of the second-in-time images 14 captured by the image sensors 12 will be perceived by the processor as further to the right of the images 14 than the distinctive features 18 would be perceived if the flexible display 10 remained did not move horizontally to the left. By calculating the arithmetic average of the MMSE motion vectors 24 for all of the image sensors 12, and by subtracting the arithmetic average of the MMSE motion vectors 24 from each of the MMSE motion vectors 24, the arithmetic unit 26 is able to negate the common motion (e.g. a lateral motion) from the previous time to the current time.

For example, as can be seen in FIG. 3, the MMSE motion vectors 24A0-1 and 24B0-1 have a larger positive x-value than the corresponding differential motion vectors 25A0-1 (e.g., a first-image-sensor differential motion vector) and 25B0-1 (e.g., a second-image-sensor differential motion vector). This is demonstrated by the MMSE motion vectors 24A0-1 and 24B0-1 both being to the right of the dashed vertical line (e.g., being in the second and third quadrants of the X-Y graph, respectively). That is, the MMSE motion vectors 24A0-1 and 24B0-1 point further to the right than the corresponding differential motion vectors 25A0-1 and 25B0-1 due to the fact that the distinctive features 18 captured by both of the image sensors 12 had a rightward component to their comparative motion in the images 14 from time t=0 to time t=1. By removing the component of the perceived rightward motion experienced by both of the image sensors 12A and 12B, the arithmetic unit 26 is able to negate the common components of motion when calculating the differential motion vectors 25, thereby enabling more accurate calculation of the change in bend angle of the image sensors 12 with respect to the front-surface normal of the display 10.

As can be seen in FIG. 3, the MMSE motion vectors 24A1-2 and 24B1-2 and the corresponding differential motion vectors 25A1-2 and 25B1-2 corresponding to the change in time from time t=1 to time t=2 are respectively the same. This is due to the lack of a common component of motion of the distinctive features 18 captured by the image sensors 12 from time t=1 to time t=2. Because there is no common component of motion to be removed by the arithmetic unit 26, the arithmetic average of the MMSE motion vectors 24 is nil, and the differential motion vectors 25 are each equal to their corresponding MMSE motion vectors 24, respectively.

After the arithmetic unit 26 uses the average of the MMSE motion vectors 24 to negate common movement of the flexible display 10 with respect to the distinctive features 18, the information corresponding to the differential motion vectors 25 (i.e., the vectors 25 resulting from subtracting the average of the MMSE motion vectors 24 from each of the MMSE motion vectors 24) is sent to the geometric unit 28.

The geometric unit 28 then measures the number of pixels in the X-axis and the Y-axis of each of the differential motion vectors 25A0-1, 25B0-1, 25A1-2, and 25B1-2 to determine a length thereof. Based on the measured number of pixels per degree of field of view of the image sensors 12, the geometric unit 28 then calculates the angles of deflection $\theta_{Ay1}$, $\theta_{Ay2}$, $\theta_{By1}$, and $\theta_{By2}$ for each of the image sensors 12A and 12B with respect to the front-surface normal 16 of the display, for each of the time sequences (e.g., the relative change in the angle $\theta_{Ay1}$ of image sensor 12A from time t=0 to time t=1, and also the relative change in the angle $\theta_{Ay2}$ of image sensor 12A from time t=1 to t=2, while also calculating $\theta_{By1}$ and $\theta_{By2}$ for corresponding time sequences for image sensor 12B). Separate angles of bending may be calculated by projecting the angles of deflection with respect to the front-surface normal 16 onto the front-surface plane of the flexible display and determining the portions of the angles of deflection along the X-axis to get X angles of bending of the image sensors 12 and along the Y-axis to get Y angles of bending of the image sensors 12. Although the image sensors 12A and 12B in the present example shown in FIG. 3 undergo deflections along the X-axis from t=0 to t=1, the corresponding deflection angles $\theta_{Ax1}$ and $\theta_{Bx1}$ are not discussed, as the method for their calculation will be similar to that described above, and will be understood by one of ordinary skill in the art.

After calculating the various angles of deflection and/or angles of bending for the various times, the geometric unit 28 maps the angles to their corresponding image sensor 12 locations as a function of time. By completing these calculations for each of the plurality of image sensors 12, the device is able to measure the changing shape of the display over time, which correlates to the direction and degree of bending of the display.

Example embodiments have been disclosed herein, and although specific terms are employed, they are used in, and are to be interpreted in, a generic and descriptive sense only, and are not to be used or interpreted for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims and their equivalents.

What is claimed is:

1. A detection device of a flexible display, the detection device comprising:
   an image sensor "A" and an image sensor "B" configured to capture first-in-time images captured at a first time, and second-in-time images captured at a second time after the first time;
   a processor configured to process the images captured by the image sensors;
   a memory having instructions stored therein; and
   an arithmetic unit configured to negate a common movement of the image sensor "A" and the image sensor "B" that occurs between the first time and the second time by separating the common movement from one or more non-common movements of the image sensor "A" and the image sensor "B" to enable calculation of a bend angle based on distinctive features in each of the first-in-time images captured by the image sensor "A" and the image sensor "B" and in each of the second-in-time images captured by the image sensor "A" and the image sensor "B", wherein the same distinctive features are captured by both of the image sensor "A" and the image sensor "B" in both of the first-in-time images and the second-in-time images,
   wherein executing the instructions stored in the memory cause the detection device to determine angles of deflection of a line-of-sight of each of the image sensors to calculate the bend angle of a front-surface plane of the flexible display by:
   locating the distinctive features;
   marking a set of second coordinates for each of the distinctive features in each of the second-in-time images; and
   marking a set of first coordinates for each of the distinctive features in each of the first-in-time images;
   for each of the distinctive features of the image-sensor-A images, calculating a first-image-sensor motion vector corresponding to a first distance and direction from one of the sets of first coordinates of the image-sensor-A images to a corresponding set of second coordinates of the image-sensor-A images;
   for each of the distinctive features of the image-sensor-B images, calculating a second-image-sensor motion vector corresponding to a second distance and direction from one of the sets of first coordinates of the imaqe-sensor-B images to a corresponding set of second coordinates of the image-sensor-B images;
   calculating a first-image-sensor minimum mean-square error (MMSE) motion vector with a minimum mean-square error corresponding to a best-fit of the first-image-sensor motion vectors; and
   calculating a second-image-sensor MMSE motion vector with a minimum mean-square error corresponding to a best-fit of the second-image-sensor motion vectors.

2. The detection device of claim 1, wherein the image sensors are on a periphery of a flexible display.

3. The detection device of claim 1, further comprising a buffer configured to store the images captured by the image sensors, and configured to provide the images.

4. The detection device of claim 1, wherein the arithmetic unit is further configured to:
   receive the first-image-sensor MMSE motion vector and the second-image-sensor MMSE motion vector;
   calculate an arithmetic average of the first-image-sensor MMSE motion vector and the second-image-sensor MMSE motion vector;
   subtract the arithmetic average from the first-image-sensor MMSE motion vector to generate a first-image-sensor differential motion vector; and
   subtract the arithmetic average from the second-image-sensor MMSE motion vector to generate a second-image-sensor differential motion vector.

5. The detection device of claim 4, wherein the arithmetic unit is further configured to negate the common movement of the image sensors with respect to an environmental area corresponding to the distinctive features when generating the differential motion vectors.

6. The detection device of claim 4, further comprising a geometric unit configured to:
   receive the differential motion vectors from the arithmetic unit;
   measure a number of pixels corresponding to a length of each of the differential motion vectors;
   respectively convert the measured numbers of pixels into the angles of deflection of the line-of-sight of each of the image sensors with respect to a front-surface normal of the flexible display;
   map the angles of deflection as a function of time; and
   convert the angles of deflection to bend angles of the front-surface plane of the flexible display.

7. The detection device of claim 6, wherein the instructions stored in the memory, when executed, cause the detection device to process information as a result of the bend angles, and
   wherein the angles of deflection correspond to X-axis angles measured with respect to an X- axis and Y-axis angles measured with respect to a Y-axis.

8. A detection device comprising:
a plurality of image sensors on a flexible display and configured to capture first-in-time images captured at a first time, and second-in-time images captured at a second time after the first time; and
an arithmetic unit configured to negate a common movement of the plurality of image sensors that occurs between the first time and the second time by separating the common movement from one or more non-common movements of respective ones of the image sensors based on a distinctive feature in each of the first-in-time images and in each of the second-in-time images to calculate a bending of the flexible display,
wherein the detection device is configured to detect the bending of the flexible display by comparing the first-in-time images captured by each of the plurality of image sensors with respective ones of the second-in-time images captured by each of the plurality of image sensors to determine an angle that the plurality of image sensors has moved with respect to a reference point of the flexible display by:
locating one or more distinctive features commonly found in the first-in-time images and the second-in-time images;
marking a set of second coordinates for each of the one or more distinctive features in the second-in-time images;
marking a set of first coordinates for each of the one or more distinctive features in the first-in-time images;
calculating, for each of the distinctive features of the first-in-time images and the second-in-time images of each of the image sensors, a plurality of motion vectors corresponding to a distance between each set of the first coordinates and a respective set of the second coordinates; and
calculating, for each of the image sensors, a minimum mean-square error (MMSE) motion vector with a minimum mean-square error representing a best-fit vector of the plurality of motion vectors.

9. The detection device of claim 8, wherein the detection device is configured to calculate a degree of the detected bending by:
storing the first-in-time images, and the second-in-time images; and
comparing the first-in-time images to respective ones of the second-in-time images captured by a same one of the image sensors.

10. A method of detecting a bending of a flexible display, the method comprising:
capturing a plurality of first-in-time images at a first time using a plurality of image sensors on the flexible display;
capturing a plurality of second-in-time images at a second time using the plurality of image sensors, the second time being after the first time;
comparing a first of the first-in-time images, which is taken by a first of the image sensors, to a first of the second-in-time images, which is taken by the first of the image sensors, and comparing a second of the first-in-time images, which is taken by a second of the image sensors, to a second of the second-in-time images, which is taken by the second of the image sensors, by
locating one or more distinctive features commonly found in the first-in-time images and the second-in-time images;
marking a set of second coordinates for each of the one or more distinctive features in the second-in-time images;
marking a set of first coordinates for each of the one or more distinctive features in the first-in-time images;
calculating, for each of the distinctive features of the first-in-time images and the second-in-time images of each of the image sensors, a plurality of motion vectors corresponding to a distance between each set of the first coordinates and a respective set of the second coordinates; and
calculating, for each of the image sensors, a minimum mean-square error (MMSE) motion vector with a minimum mean-square error representing a best-fit vector of the plurality of motion vectors;
separating a common movement of the plurality of image sensors that occurs between the first time and the second time from one or more non-common movements of the plurality of image sensors based on the one or more distinctive features, the one or more non-common movements corresponding to the bending of the flexible display; and
negating the common movement, to detect the bending of the flexible display.

11. The method of claim 10, wherein comparing the first-in-time images to the second-in-time images comprises executing instructions stored in a memory using a processor.

12. The method of claim 10, further comprising:
determining an angle corresponding to a change in a line-of-sight of one of the image sensors relative to a reference point of the flexible display from the first time to the second time according to the comparing of the first-in-time images to the second-in-time images; and
calculating an angle of deflection corresponding to the change in the line-of-sight.

13. The method of claim 12, further comprising mapping a plurality of calculated angles of deflection over time to determine lifetime stress diagnostics.

14. The method of claim 13, further comprising converting the angle of deflection to a bend angle corresponding to a degree to which the flexible display is bent with respect to a front-surface plane of the flexible display.

15. The method of claim 10, wherein comparing the first-in-time images to the second-in-time images further comprises:
calculating an arithmetic average of all of the MMSE motion vectors; and
subtracting the arithmetic average from each of the MMSE motion vectors to generate a differential motion vector for each of the image sensors, thereby negating the common movement of the image sensors.

16. The method of claim 15, further comprising calculating one or more bend angles of the front-surface plane of the flexible display by:
measuring a number of pixels in one or more axes corresponding to a length of each of the differential motion vectors;
converting the numbers of pixels in the one or more axes into one or more angles of deflection of a line-of-sight of each of the image sensors based on the number of pixels per degree of field of view of each of the image sensors; and mapping the one or more angles of deflection as a function of time; and converting the one or more angles of deflection to the one or more bend angles corresponding to a degree of bending of the flexible display with respect to a front-surface plane of the flexible display.

* * * * *